United States Patent
Sio et al.

(10) Patent No.: US 11,222,157 B2
(45) Date of Patent: *Jan. 11, 2022

(54) PIN ACCESS HYBRID CELL HEIGHT DESIGN

(71) Applicant: TAIWAN SEMICONDUCTOR MANUFACTURING COMPANY LTD., Hsinchu (TW)

(72) Inventors: Kam-Tou Sio, Zhubei (TW); Jiann-Tyng Tzeng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,509

(22) Filed: Aug. 17, 2020

(65) Prior Publication Data
US 2020/0380193 A1  Dec. 3, 2020

Related U.S. Application Data

(63) Continuation of application No. 16/556,928, filed on Aug. 30, 2019, now Pat. No. 10,769,342.

(60) Provisional application No. 62/753,427, filed on Oct. 31, 2018.

(51) Int. Cl.
| | |
|---|---|
| *G06F 30/00* | (2020.01) |
| *G06F 30/392* | (2020.01) |
| *G03F 1/36* | (2012.01) |
| *G06F 30/394* | (2020.01) |
| *G06F 111/04* | (2020.01) |
| *G06F 119/18* | (2020.01) |

(52) U.S. Cl.
CPC .............. *G06F 30/392* (2020.01); *G03F 1/36* (2013.01); *G06F 30/394* (2020.01); *G06F 2111/04* (2020.01); *G06F 2119/18* (2020.01)

(58) Field of Classification Search
CPC .... G06F 30/392; G06F 30/394; G06F 30/398; G06F 2111/04; G06F 2119/18; G03F 1/36; H01L 27/0207; H01L 23/49
See application file for complete search history.

(56) References Cited

U.S. PATENT DOCUMENTS

| | | | |
|---|---|---|---|
| 6,054,872 | A | 4/2000 | Fudanuki |
| 7,194,717 | B2 | 3/2007 | Andreev |
| 7,260,442 | B2 | 8/2007 | Hwang et al. |
| 7,989,849 | B2 | 8/2011 | Sherlekar |
| 9,256,709 | B2 | 2/2016 | Yu et al. |
| 9,292,644 | B2 | 3/2016 | Loh |

(Continued)

*Primary Examiner* — Naum Levin
(74) *Attorney, Agent, or Firm* — Hauptman Ham, LLP

(57) ABSTRACT

A method includes arranging a first cell having a first cell height in a first row. The method further includes arranging a second cell having a second cell height in a second row abutting the first row, wherein the second cell height is different from the first cell height. The method further includes placing a plurality of first cell pins within the first cell, wherein each of the plurality of first cell pins extends along a corresponding routing track. The method further includes placing a plurality of second cell pins over a plurality of selected via placement points in the second cell, wherein at least one second cell pin of the plurality of second cell pins extends along a second routing track across a boundary of the second cell and into the first cell.

20 Claims, 13 Drawing Sheets

(56) References Cited

U.S. PATENT DOCUMENTS

| | | |
|---|---|---|
| 9,460,259 B2 | 10/2016 | Baek |
| 10,083,269 B2 * | 9/2018 | De Dood .............. G06F 30/398 |
| 10,769,342 B2 * | 9/2020 | Sio ........................ G06F 30/398 |
| 10,936,780 B2 * | 3/2021 | Hanchinal ......... H01L 21/76895 |
| 2014/0040838 A1 | 2/2014 | Liu et al. |
| 2015/0278429 A1 | 10/2015 | Chang |
| 2016/0086932 A1 | 3/2016 | Chen |
| 2017/0116365 A1 | 4/2017 | Cheng |
| 2018/0151496 A1 | 5/2018 | Biswas |
| 2018/0166386 A1 | 6/2018 | Biswas |
| 2019/0179993 A1 | 6/2019 | Chou |
| 2019/0211475 A1 | 7/2019 | Ito |
| 2020/0006481 A1 | 1/2020 | Yang |
| 2020/0019667 A1 | 1/2020 | Lin |

* cited by examiner

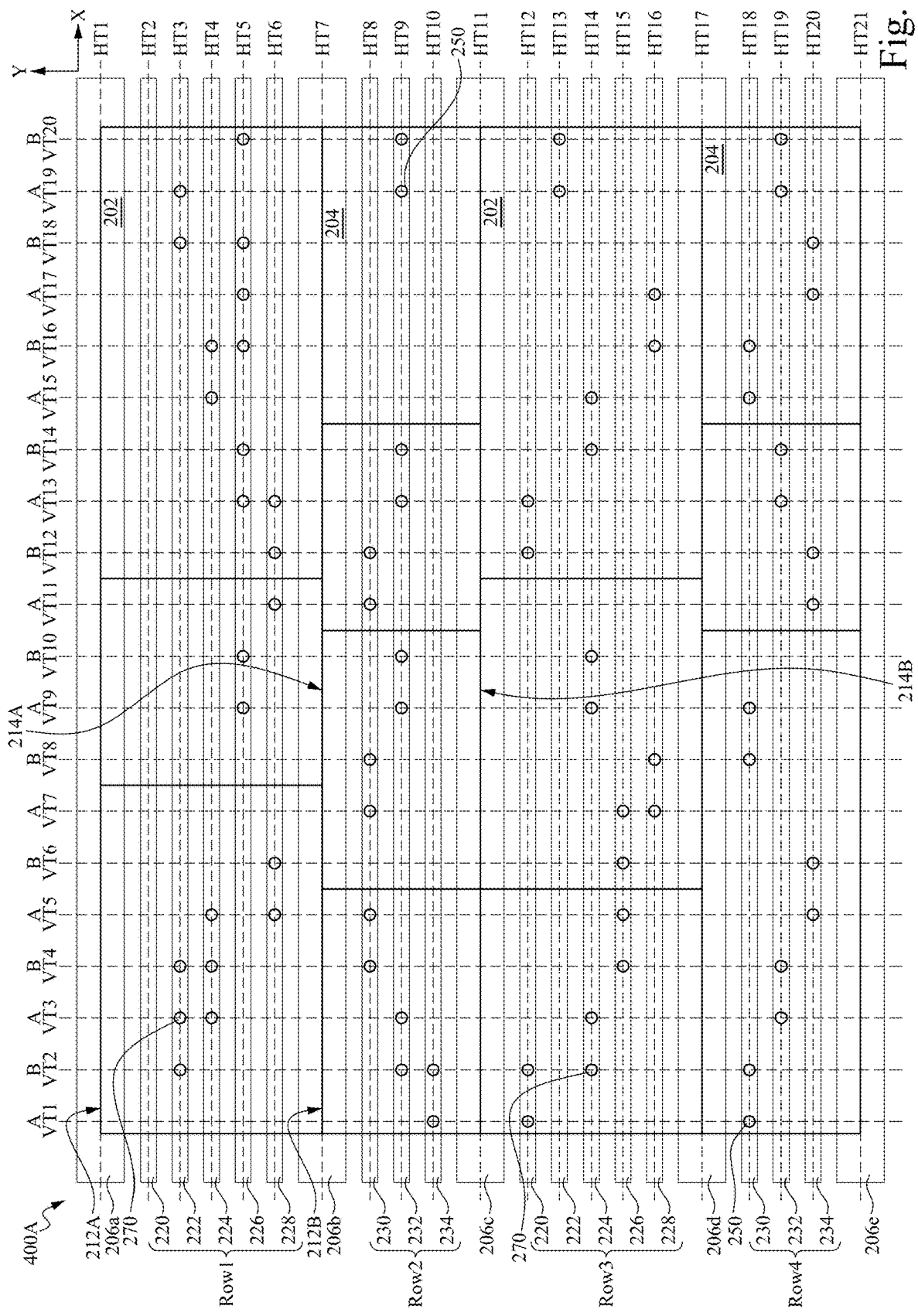

PIN ACCESS HYBRID CELL HEIGHT DESIGN

PRIORITY CLAIM

This application is a continuation of U.S. application Ser. No. 16/556,928, filed Aug. 30, 2019, now U.S. Pat. No. 10,769,342, issued Sep. 9, 2020, which claims priority to U.S. Provisional Application No. 62/753,427, filed Oct. 31, 2018, the entire contents of which are incorporated by reference herein.

BACKGROUND

Scaling of semiconductor devices follows Moore's Law in the past few decades. As advances in manufacturing processes are independently unable to keep up with the constant device scaling trend due to lithography and integration limitations, layout design techniques also help to further scaling of semiconductor devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 4A-4C are depictions of a layout diagram at various stages of generating the IC layout diagram, in accordance with some embodiments.

DETAILED DESCRIPTION

Figure 1:
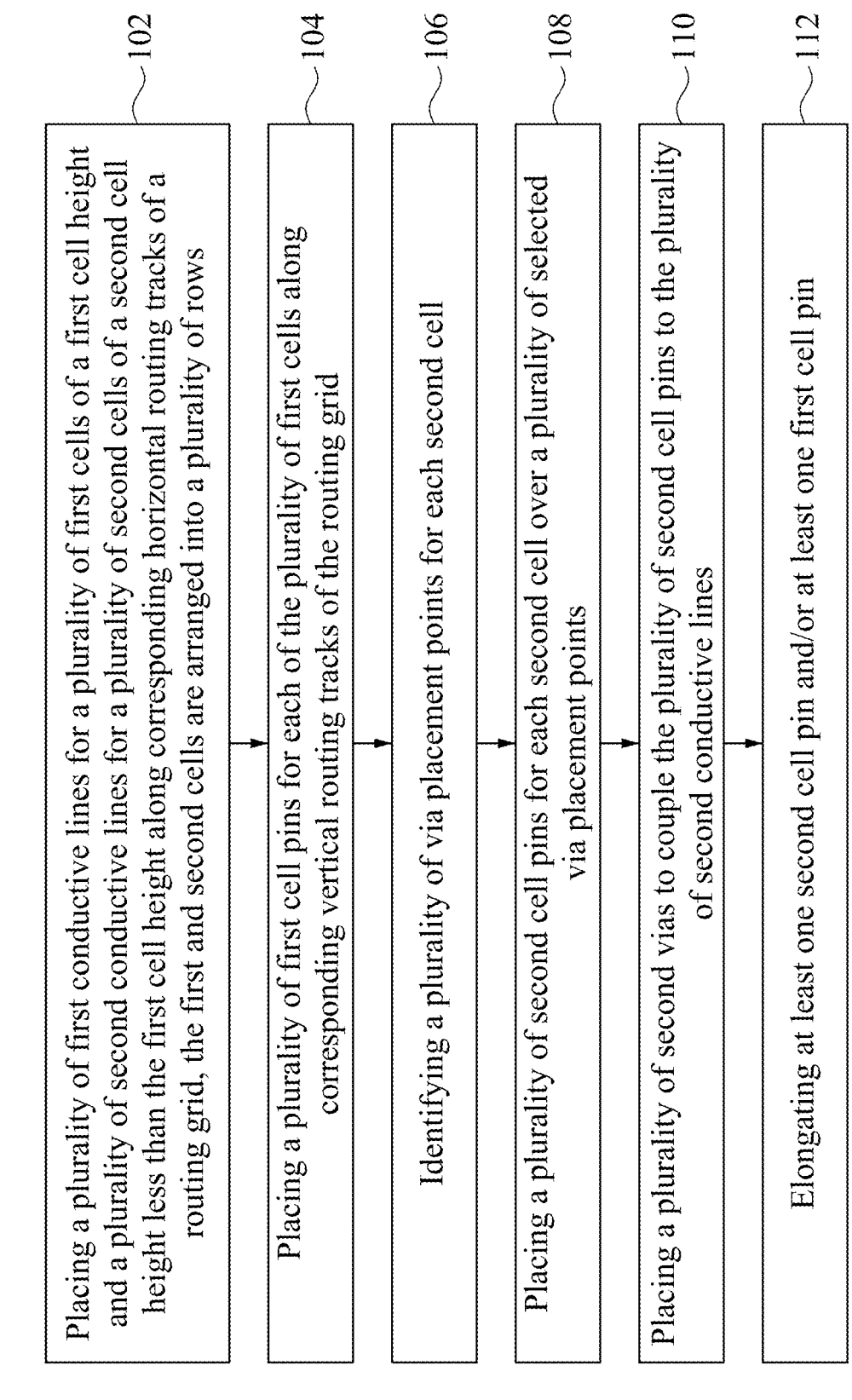
FIG. 1 is a flowchart of a method of generating a layout diagram of an integrated circuit (IC), in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some integrated circuit (IC) designs are based on a collection of cells selected from a library. The layout includes at least one logic block customized for a particular use. A logic block is an arrangement of cells placed in a routing grid of vertical and horizontal routing tracks. Conductive structures, such as metal lines, are placed on routing tracks to provide connection between cells. The design of an IC layout is carried out by an automatic placement and routing (APR) tool that includes a placer and a router, by selecting standard cells from a library of standard cells and placing and routing the cells according to a number of design rules. The placer determines the optimum location of each standard cell of the integrated circuit, and the router optimizes the routing of input/output lines and the connection between standard cells so that the IC layout does not become overly congested by input/output and other routing lines.

The placer and router uses a number of design rules to determine where to place the cells and how to create the wires to connect all the cells. The design rules for example, include minimum length of lines, minimum spacing between lines, and the like. Failure to satisfy a design rule sometimes results in a process-related problem such as shorting between meal lines due to optical proximity, in some instances.

The height of a cell is determined by the number of horizontal tracks extending between the uppermost and lowermost edges of the cell. Cells with a smaller cell height are used for realizing high integration and low power consumption, while cells with a higher cell height are used for high speed operation. In some logic blocks, the standard cells have a same cell height for easy cell placement and routing.

With the increasing demands for high speed and low power integrated circuits which are applicable for portable electronic application, logic blocks are modified to include standard cells of different cell heights. In such hybrid cell design, the standard cells are arranged in rows and in one row, only standard cells with the same height are placed.

The hybrid cell design using standard cells of different cell heights in one logic block helps to achieve both high speed and low power in an integrated circuit layout design. However, in the hybrid cell design, cell pins such as input and output pins used to transmit signals between cells suffer substantial reductions in end-to-end spacing and pin access area. As a result, additional cut masks are used in performing cell routing. The use of additional cut masks often results in increased fabrication cost.

In some embodiments, a layout design methodology for implementing cell pin placement and routing for cells of different cell heights is provided. The layout design methodology allows placing and routing pins of high speed cells and low power cells in a same logic block without the need of using additional cut masks in order to comply with the existing design rules. The layout design methodology of the present disclosure thus helps to keep the same process cost when changing traditional uniform cell height design to hybrid cell height design.

FIG. 1 is a flowchart of a method 100 of generating a layout diagram 200F of an integrated circuit (IC), in accordance with some embodiments. In various embodiments, the operations of method 100 are performed in the order depicted in FIG. 1 or in one or more orders other than the order depicted in FIG. 1. In some embodiments, one or more additional operations are performed before, between, during, and/or after one or more operations of method 100. Method 100 is described below in conjunction with FIGS. 2A-2F, which include views of various stages of generating a layout diagram 200F.

Some or all of the operations of method 100 are capable of being performed as part of an automated placement and routing (APR) tool. In some embodiments, some or all of method 100 is executed by a processor of a computer. In some embodiments, some or all of method 100 is executed by a processor 502 of an electronic design automation (EDA) system 500, discussed below with respect to FIG. 5. In some embodiments, some or all of the operations of method 100 are capable of being performed as part of a design procedure performed in a design house, e.g., a design house 620 discussed below with respect to FIG. 6.

Figure 2A:
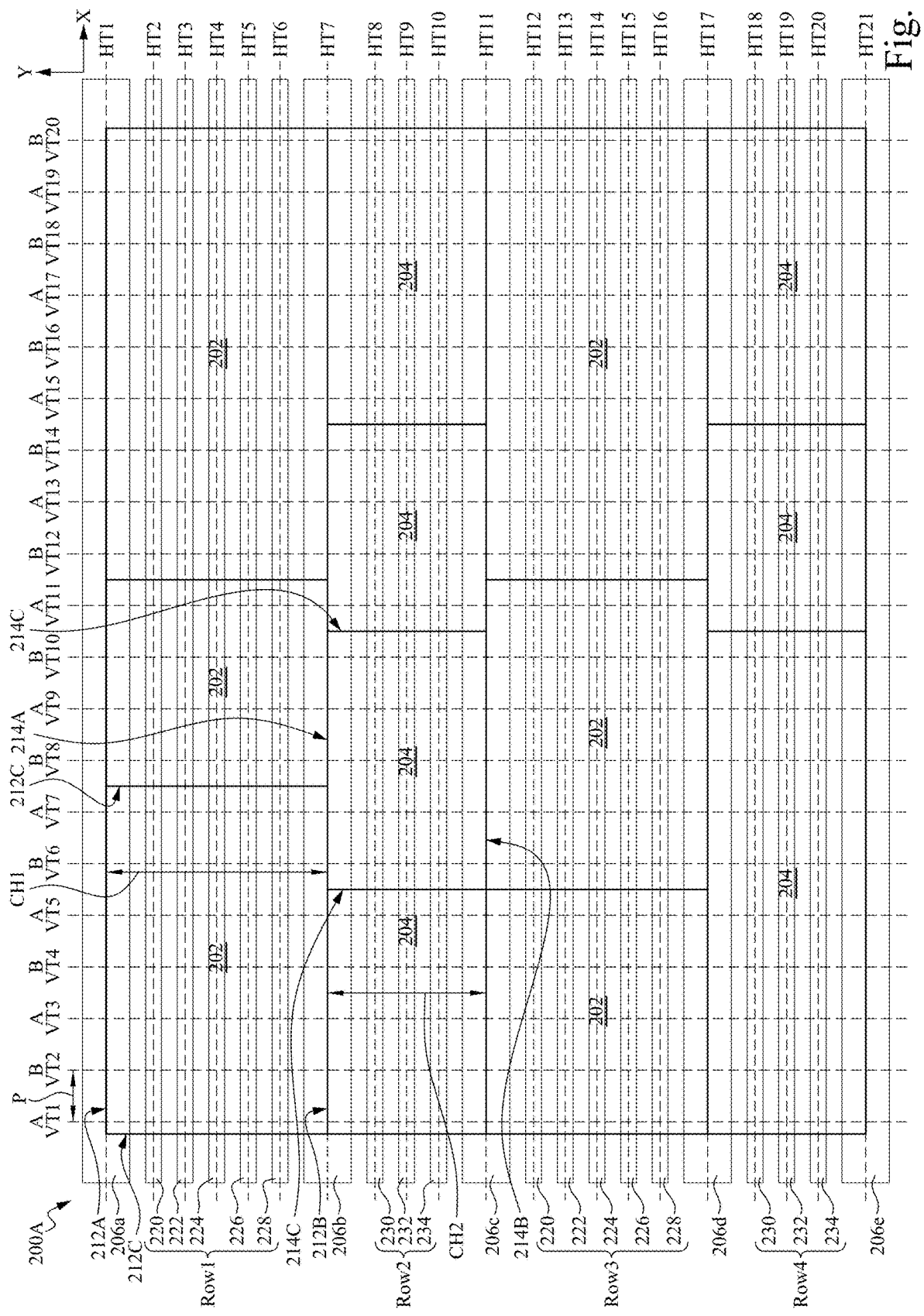
FIGS. 2A-2F are depictions of a layout diagram at various stages of generating the IC layout diagram, in accordance with some embodiments.

Referring to FIG. 1 and FIG. 2A, method 100 includes operation 102 in which a plurality of first conductive lines 220-228 for a plurality of first cells 202 having a first cell height and a plurality of second conductive lines for 232-236 for a plurality of second cells 204 having a second cell height CH1 less than the first cell height CH2 are placed along corresponding horizontal routing tracks of a plurality of horizontal routing tracks HT1-HT21; first and second cells 202 and 204 are arranged into a plurality of rows. FIG. 2A is a layout diagram 200A of an IC after placing a plurality of first conductive lines 220-228 and a plurality of second conductive lines for 232-236 along corresponding horizontal routing tracks of a plurality of horizontal routing tracks HT1-HT21, in accordance with some embodiments.

Referring to FIG. 2A, layout diagram 200A includes a plurality of cells of different cell heights, e.g. first cells 202 of a first cell height CH1 and second cells 204 of a second cell height CH2, arranged in separate rows. For simplicity of illustration, layout diagram 200A includes four rows, i.e., first row (Row 1), second row (Row 2), third row (Row 3) and fourth row (Row 4). In some embodiments, layout diagram 200A includes a number of rows other than four. Each row in the plurality of rows Row 1-Row 4 extends along the X direction. In some embodiments, the X direction is a horizontal direction of layout diagram 200A. In some embodiments, the X direction is a direction other than horizontal. Rows in the plurality of rows Row 1-Row 4 are abutted to one another in the Y direction that is perpendicular to the X direction. In some embodiments, the Y direction is a vertical direction of layout diagram 200A. In some embodiments, the Y direction is a direction other than vertical.

The plurality of rows, e.g., Row 1-Row 4, is laid out relative to a routing grid defined by a plurality of horizontal routing tracks HT1-HT21 and a plurality of vertical routing tracks VT1-VT20. Horizontal routing tracks HT1-HT21 are arranged in parallel along the X direction. Each horizontal routing track HT1-HT21 represents a potential routing path for an IC along the X direction. In some embodiments, each of horizontal routing tracks HT1-HT21 is spaced by an equal distance from an adjacent horizontal routing track HT1-HT21. Vertical routing tracks VT1-VT20 are arranged in parallel along the Y direction. Each vertical routing track VT1-VT20 represents a potential routing path for the IC along the Y direction. In some embodiments, each of vertical routing tracks VT1-VT20 is spaced by an equal distance from an adjacent vertical routing track VT1-VT20. In some embodiments, two adjacent vertical routing tracks of the plurality of vertical routing tracks VT1-VT20 are separated by a nominal minimum distance for forming clear patterns with a single exposure of a single photomask at a given technology node (without using a double patterning technique). Thus, the two vertical second routing tracks in the plurality of vertical routing tracks VT1-VT20 are designated having the same color (not shown). In some embodiments, odd-numbered vertical routing tracks VT1, VT3 . . . VT19 are spaced apart from each other by a minimum distance for forming clear patterns with a single exposure of a single photomask at a given technology node (without using a double patterning technique), and even-numbered vertical routing tracks VT2, VT4 . . . VT20 are spaced apart from each other by a minimum distance for forming clear patterns with a single exposure of a single photomask at a given technology node (without using a double patterning technique). Thus, a distance (i.e., pitch P) between two adjacent vertical routing tracks of the plurality of second routing tracks VT1-VT20 is smaller than the minimum distance permitted by the single patterning lithography. In FIG. 2A, each of vertical routing tracks VT1-VT20 is assigned a first color such as Color A, or a second color such as Color B. Starting with vertical routing track VT1, each vertical routing track VT1-VT20 is designated either Color A or Color B, such that no two adjacent vertical routing tracks are the same color. In FIG. 2A, every other vertical routing tracks VT1-VT20 is designated the same color. For example, odd-numbered vertical routing tracks VT1, VT3 . . . VT19 are designated Color A, and even-numbered second routing tracks VT2, VT4 . . . VT20 are designated Color B. The color (e.g., Color A, Color B) indicates that features with the same color are to be formed on a same mask of a multiple mask set, and features with a different color are to be formed on a different mask of the multiple mask set.

Cells 202 and 204 are placed by an APR tool during a placement stage to abut one another. Cells 202 and 204 are arranged such that cells placed in the same row have the same cell height, although widths of the cells 202 or 204 in the same row vary, in some embodiments. In some embodiments, first cells 202 and second cells 204 are placed alternately in the plurality of rows Row 1-Row 4. In FIG. 2A, first cells 202 having the first cell height CH1 are placed in the odd-number rows, e.g., Row 1 and Row 3, and second cells 204 having the second cell height CH2 are placed in the even-number rows, e.g., Row 2 and Row 4. In some embodiments, the first cell height CH1 is set to be greater than the second cell height CH2. The cell height CH of a cell, e.g., cell 202 or 204 is determined by the number of horizontal routing tracks HT1-HT21 encompassed between the uppermost edge and lowermost edge of the cell 202 or 204. In some embodiments, each first cell 202 has a track height of seven (7) and each second cell 204 has a track height of five (5). First cells 202 with a relatively large cell height CH1 operate at a higher speed, and are thus applicable for high speed applications. Second cells 204 with a relatively small cell height CH2 operate with less power, and are thus usable for low power applications. Although cells in adjacent rows in FIG. 2A have different cell heights, cells in adjacent rows having the same height are contemplated in the present disclosure. In some embodiments and in FIG. 2A, the number of rows in the plurality of rows for placing first cells 202 is equal to the number of rows (e.g., Row 1 and Row 3) in the plurality of rows for placing second cells 204 (e.g., Row 2 and Row 4). One of ordinary skill in the art would understand that in some embodiments, the number of rows in the plurality of rows for placing first cells 202 is different from the number of rows in the plurality of rows for placing second cells 204 (not shown).

In some embodiments, cells 202 and 204 are standard cells. The standard cells include, but are not limited to, an INV, AND, OR, NAND, NOR, XOR, AOI, OAI, MUX, BUFF, adder, filler, flip-flop, latch, delay, clock cell, or the like. Alternatively, cells 202 and 204 are custom cells. Cells 202 and 204 are placed, during a placement stage, by an APR tool.

Each of first cells 202 has a substantially rectangular shape which includes a top boundary 212A, a bottom boundary 212B, and opposite side boundaries 212C. Top boundary 212A and bottom boundary 212B are parallel to the X direction. Side boundaries 212C are parallel to the Y direction. The height of each first cell 202, i.e., the cell height CH1, is defined between top boundary 212A and bottom boundary 212B. Likewise, each of second cells 204 has a substantially rectangular shape which includes a top boundary 214A, a bottom boundary 214B, and opposite side boundaries 214C. Top boundary 214A and bottom boundary 214B are parallel to the X direction. Side boundaries 214C are parallel to the Y direction. The height of each second cell 204, i.e., the cell height CH2, is defined between top boundary 214A and bottom boundary 214B. As first cells 202 in one row, e.g., Row 1 or Row 3, abut second cells 204 in an adjacent row, e.g., Row or Row 4, top and bottom boundaries 214A, 214B of second cells 204 are merged with corresponding top and bottom boundaries 212A, 212B of first cells 202 in adjacent rows, Row 1-Row 4. For example, in FIG. 2A, top boundaries 214A of second cells 204 in Row 2 are merged with bottom boundaries 212B of first cells 202 in Row 1, bottom boundaries 214B of second cells 204 in Row 2 are merged with top boundaries 212A of first cells 202 in Row 3, and top boundaries 214A of second cells 204 in Row 4 are merged with bottom boundaries of first cells 202 in Row 3.

Layout diagram 200A further includes a plurality of power rails, e.g., 206a-206e, extending along boundaries of the plurality of rows Row 1-Row 4. In FIG. 2A, power rail 206b is present at the common boundary of Row 1 and Row 2, power rail 206c is present at the common boundary of Row 2 and Row 3, and power rail 206d is present at the common boundary of Row 3 and Row 4. Each of power rails 206a-206e is used to provide one of a source voltage potential Vdd and a ground voltage potential Vss to a cell 202 or 204 in a corresponding row 1-Row 4. Power rails 206a-206e are rectangular with long axes substantially aligned with corresponding horizontal routing tracks, e.g., HT1, HT7, HT11, HT17 and HT21. In some embodiments, top boundary 212A of each first cell 202 is defined in the middle of a corresponding power rail 206a or 206c, and bottom boundary 212B of each first cell 202 is defined in the middle of a corresponding power rail 206b or 206b. Also, top boundary 214A of each second cell 204 is defined in the middle of a corresponding power rail 206b or 206d, and bottom boundary 214B of each second cell 204 is defined in the middle of a corresponding power rail 206c or 206e.

Each of first cells 202 includes a plurality of first conductive lines 220, 222, 224, 226 and 228 within top and bottom boundaries 212A, 212B thereof. First conductive lines 220, 222, 224, 226 and 228 in each of first cells 202 are arranged substantially parallel to one another along the X direction and aligned with corresponding horizontal routing tracks, e.g., HT2-HT6 and HT12-HT16. Each of second cells 204 includes a plurality of second conductive lines 232, 234 and 236 within top and bottom boundaries 214A, 214B thereof. Second conductive lines 232, 234 and 236 in each of second cells 204 are arranged substantially parallel to one another along the X direction and aligned with corresponding horizontal routing tracks, e.g., HT8-HT10 and HT18-20.

In some embodiments, power rails 206a-206e and conductive lines 220-228 and 232-236 are formed within a first metal layer, i.e., M1 layer that is close to a substrate where active components of cells 202 and 204, e.g., transistors or the like, are formed. During a routing stage, power rails 206a-e and conductive lines 220-228 and 232-236 are laid out with respect to the corresponding horizontal routing tracks HT1-HT21 by the APR tool.

Figure 2B:
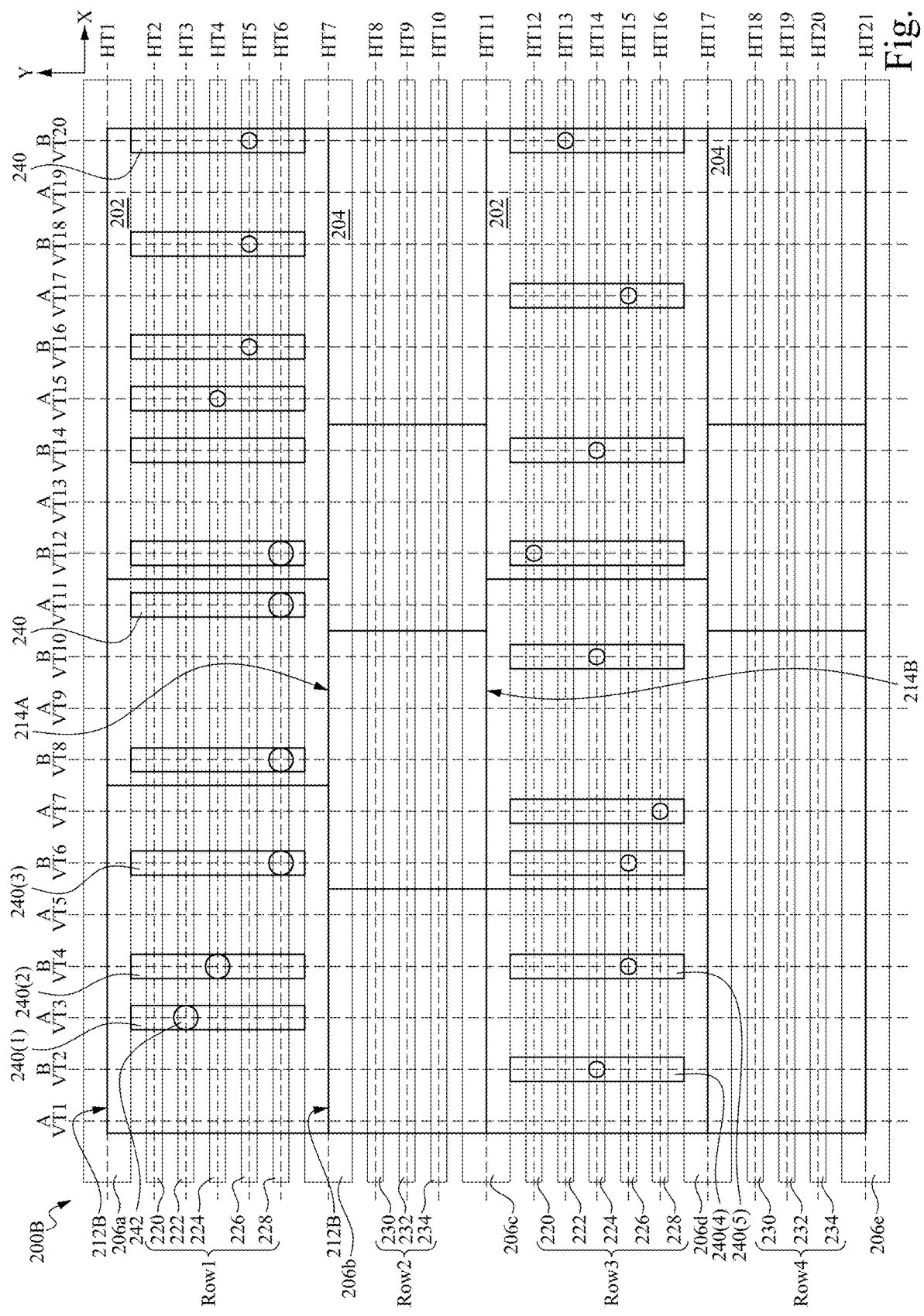

Referring to FIG. 1 and FIG. 2B, method 100 proceeds to operation 104 in which a plurality of first cell pins 240 for each first cell 202 is placed along corresponding vertical routing tracks of the plurality of vertical routing tracks VT1-VT20. FIG. 2B is a layout diagram 200B of layout diagram 200A after placing a plurality of first cell pins 240 along corresponding vertical routing tracks of the plurality of vertical routing tracks VT1-VT20 for each first cell 202, in accordance with some embodiments.

A cell pin described herein refers to a conductive line that carries an input or output signal for a cell. In some embodiments and in FIG. 2B, the plurality of first cell pins 240 within each first cell 202 comprises at least one input pin adapted to receive an input signal into the cell or at least one output pin adapted to transfer an output signal from the cell. The numbers of input pins and output pins within each first cell 202 are adjusted according to actual circuit demands. For example, the leftmost first cell 202 in Row 1 includes three first cell pins 240(1)-240(3) in which first cell pins 240(1) and 240(2) are used as input pins and first cell pin 240(3) is used as an output pin; while the leftmost first cell 202 in Row 3 includes two first cell pins 240(4)-240(5) in which first cell pin 240(4) is used as an input pin and first cell pin 240(5) is used as an output pin.

Each first cell pin 240 extends in the Y-direction and is aligned with a corresponding vertical routing track of the plurality of vertical routing tracks VT1-VT20. Each first cell pin 240 is rectangular and has a length along the Y-direction and a width along the X direction. The length of first cell pins 240 is equal to or greater than a minimum length that is specified by a first design rule for a particular manufacturing process, and thus satisfies the design rule line length requirement. As used herein, the minimum length of a manufacturing process is the smallest length in which a conductive line can be fabricated while still satisfying the corresponding design rule so as to avoid erroneous circuit function. In some embodiments, a second design rule imposes a minimum boundary offset between ends of first cell pin 240 and top and bottom boundaries 212A, 212B of first cell 202. First cell pins 240 thus reside within top and bottom boundaries 212A, 212B such that no first cell pin 240 terminates at a top or bottom edge 212A or 212B of first cells 202 to satisfy the minimum boundary offset guidelines. In some embodiments, first cell pins 240 extend across the entire set of first conductive lines 220-228 enclosed in first cells 202.

Each first cell pin 240 is assigned with a color the same as the color of the corresponding vertical routing track VT1-VT20 along which the first cell pin 240 extends. In some embodiments, a first set of first cell pins 240 extending along odd numbered vertical routing tracks VT1, VT3 . . . VT19 are assigned the first color, e.g., color A, and a second set of first cell pins 240 extending along even numbered vertical routing tracks VT2, VT4 . . . VT20 are assigned the second color, e.g., color B, indicating that the first set of first cell pins 240 are formed using a first mask and the second set of first cell pins 240 are formed using a second mask different from the first mask.

In some embodiments, first cell pins 240 are located within a second metal layer, i.e., M2 layer, overlying the M1 layer. First cell pins 240 are electrically coupled to corresponding first conductive lines 220-228 by way of a plurality of first vias 242 arranged below first cell pins 240. Each first via 242 is at an intersection between a first cell pin 240 and a corresponding first conductive line 220-228.

Figure 2C:
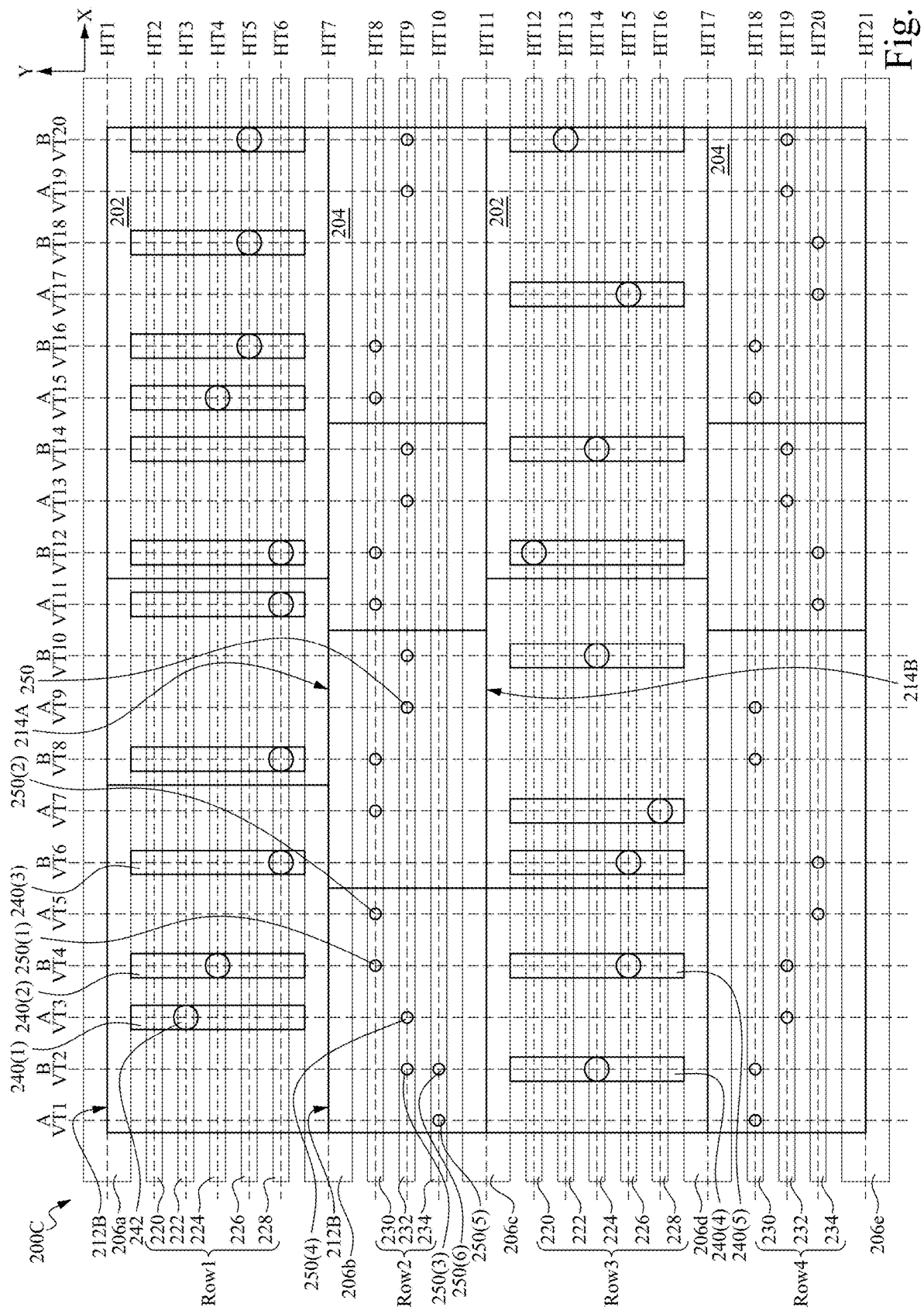

Referring to FIG. 1 and FIG. 2C, method 100 proceeds to operation 106 in which a plurality of via placement points 250 are identified for each of second cells 204. FIG. 2C is a layout diagram 200C of layout diagram 200B after identifying the plurality of via placement points 250 for each of second cells 204, in accordance with some embodiments.

Via placement points 250 correspond to possible locations for placing vias 262 (FIG. 2E) that electrically connect second conductive lines 232-236 in the M1 layer to second cell pins 260 (FIG. 2D) to be formed in the overlying M2 layer, thereby enabling device signal transmission. Via placement points 250 are located at intersections of second conductive lines 232-236 and corresponding vertical routing tracks in vertical routing tracks VT1-VH20. For example, for the leftmost second cell 204 in Row 2, two exemplary via placement points 250(1) and 250(2) are identified as possible locations for placing vias over a second conductive line 232 laid on horizontal routing track HT8, two exemplary via placement points 250(3) and 250(4) are identified as possible locations for placing vias over a second conductive line 234 laid on horizontal routing track HT9, and two exemplary via placement points 250(5) and 250(6) are identified as possible locations for placing vias over a second conductive line 236 laid on horizontal routing track HT9.

Figure 2D:
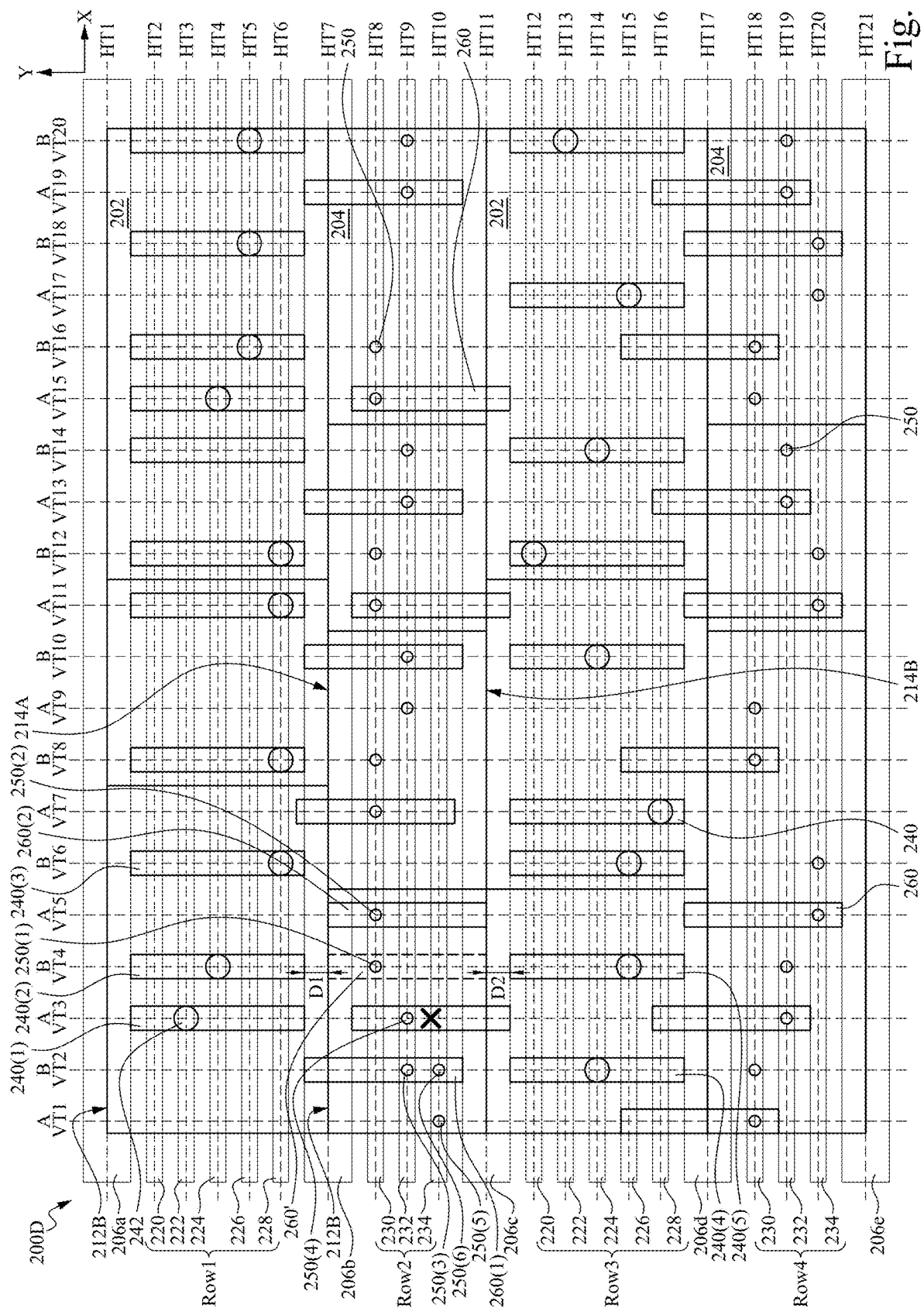

Referring to FIG. 1 and FIG. 2D, method 100 proceeds to operation 108 in which a plurality of second cell pins 260 for each second cell 204 is placed over a plurality of selected via placement points 250. FIG. 2D is a layout diagram 200D of layout diagram 200C after placing a plurality of second cell pins 260 over a plurality of selected via placement points 250 for each second cell 204, in accordance with some embodiments.

In some embodiments, a third design rule imposes a minimum end-to-end spacing requirement that specifies that facing ends of adjacent cell pins on the same vertical routing track must be a minimum distance apart. The minimum end-to-end spacing is a parameter of a particular process technology node. In operation 108, via placement points 250 identified in operation 106 are checked to determine whether there is a sufficient space available to place a second cell pin 260 over a via placement point 250 such that the second cell pin 260 is separated from an adjacent first cell pin 240 that is on the same vertical routing track VT1-VT20 as the second cell pin 260 by the minimum end-to-end spacing. After checking, a subset of via placement points 250 suitable for placing second cell pins 260 for second cells 204 are selected Criteria for selecting via placement points 250 for placing second cell pins 260 to satisfy the minimum end-to-end spacing requirement are illustrated and described below using exemplary second cell pins 260(1)-260(3) and exemplary via placement points 250(1)-250(6) identified for the leftmost second cell 204 in Row 2. A second cell pin 260(1) can be placed either over via placement point 250(3) or over via placement point 250(6) along vertical routing track VT2 without causing a minimum end-to-end spacing violation. This is so because in rows, i.e., Row 1 and Row 3 that are immediately adjacent to Row 2, only the leftmost first cell 202 in Row 3 contains a first cell pin 240(4) along the same vertical routing track VT2, while a portion of vertical routing track VT2 in Row 1 is unoccupied. Second cell pin 260 (1) thus can be extended to cross top boundary 214A of second cell 204 and onto the unoccupied portion of vertical routing track VT2 in the leftmost first cell 202 of Row 1 to ensure that an end of second cell pin 260(1) is spaced from an adjacent end of first cell pin 240(4) by a distance that is equal to or greater than the minimum end-to-end spacing. Similarly, along vertical routing track VT5, a second cell pin 260(2) can be placed over via placement point 250(2) without causing a minimum end-to-end spacing violation. This is so because none of the leftmost first cells 202 in Row 1 and Row 3 contains a first cell pin 240 along the same vertical routing track VT5 to trigger the minimum end-to-end spacing violation so as to prevent placement of the second cell pin 260(2) over via placement point 250(2). In some embodiments, second cell pin 260(2) can be formed to have both ends terminated at opposite top and bottom boundaries 214A and 214B of the leftmost second cell 204 in Row 2. In other embodiments, second cell pin 2602(2) can be formed to have an end terminated within the leftmost second cell 204 in Row 2 and an opposite end extending across a corresponding boundary 214A or 214B and onto a portion of vertical routing track VT5 in Row 1 or onto a portion of vertical routing track VT5 in Row 3 because both portions of vertical routing track VT5 in Row 1 and Row 3 are unoccupied. In contrast, placing a cell pin 260' over via placement point 250(1) along vertical routing track VT4 is forbidden by the minimum end-to-end spacing requirement as indicated by the cross symbol because each of the leftmost first cells 202 in Row 1 and Row 3 contains a first cell pin 240(2) or 240(5) along the same vertical routing track VT4 and no sufficient space is available to accommodate a cell pin therebetween without causing a minimum end-to-end spacing violation. Placing cell pin 260' between two first cell pins 240(2) and 240(5) in Row 1 and Row 3 along the same vertical routing track VT4 would trigger a minimum end-to-end spacing violation as the distance D1 between facing ends of cell pin 260' and first cell pin 240(2) in Row 1 or the distance D2 between facing ends of cell pin 260' and first cell pin 240(5) in Row 3 is less than the minimum end-to-end spacing. If cell pin 260' is placed over via placement point 250(1) along vertical routing track VT4, manufacturing an IC from layout diagram 200F (FIG. 2F) has an increased risk of resulting in a faulty circuit.

Subsequently, second cell pins 260 configured to input and output signals to second cells 204 are placed over the selected via placement points 250 extending along corresponding vertical routing tracks VT1-VT21 where the selected via placement points 250 are located. Accordingly, in compliance with the minimum end-to-end spacing requirement, in some embodiments, a second cell pin 260 for a second cell 204 can be formed to have one end terminated within a corresponding top or bottom boundary 214A or 214B and an opposite end extending across a corresponding top or bottom boundary 214A or 214B into an adjacent first cell 202 that does not contain a first cell pin 240 on the same vertical routing track VT1-VT20. In this case, the second cell pin 260 can be formed of any length such that in some embodiments, second cell pin 260 has a length equal to or greater than the minimum line length. In this case, second cell pin 260 has a length less than the minimum line length. In instances where adjacent vertical tracks VT1-VT20 are assigned with different colors, second cell pins 260 on adjacent vertical routing tracks VT1-VT20 are also assigned with different colors, Color A or Color B, indicating that adjacent second cell pins 260 are fabricated by different masks.

Figure 2E:
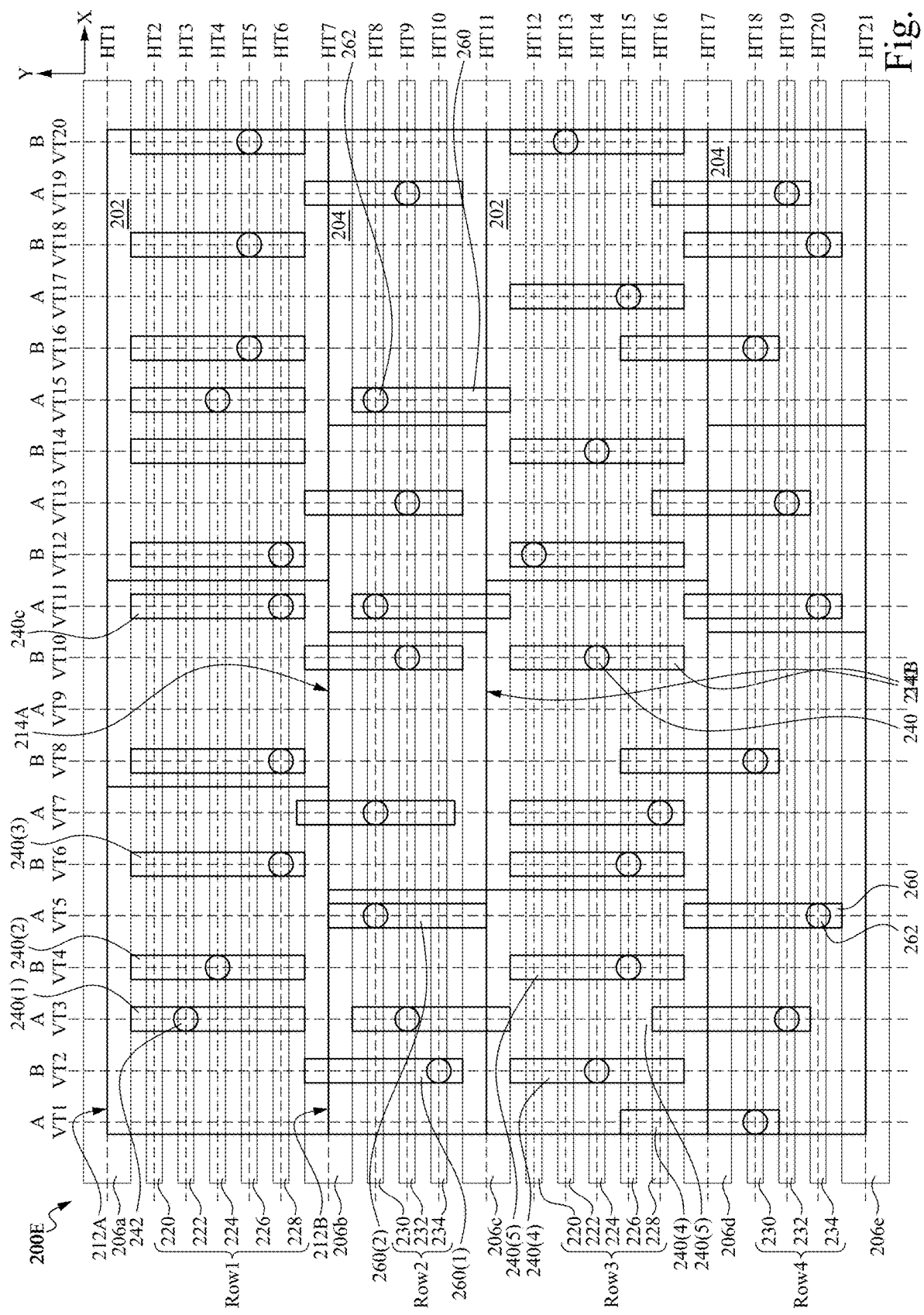

Referring to FIG. 1 and FIG. 2E, method 100 proceeds to operation 110 in which a plurality of second vias 262 is placed to couple the plurality of second cell pins 260 to the plurality of second conductive lines 232-236. FIG. 2E is a layout diagram 200E of layout diagram 200D after placing a plurality of second vias 262 to couple the plurality of second cell pins 260 to the plurality of second conductive lines 232-236, in accordance with some embodiments.

Second cell pins 260 are electrically coupled to corresponding underlying second conductive lines 232-236 through second vias 262. Second vias 262 are placed at locations of those via placement points 250 selected in operation 108.

Figure 2F:
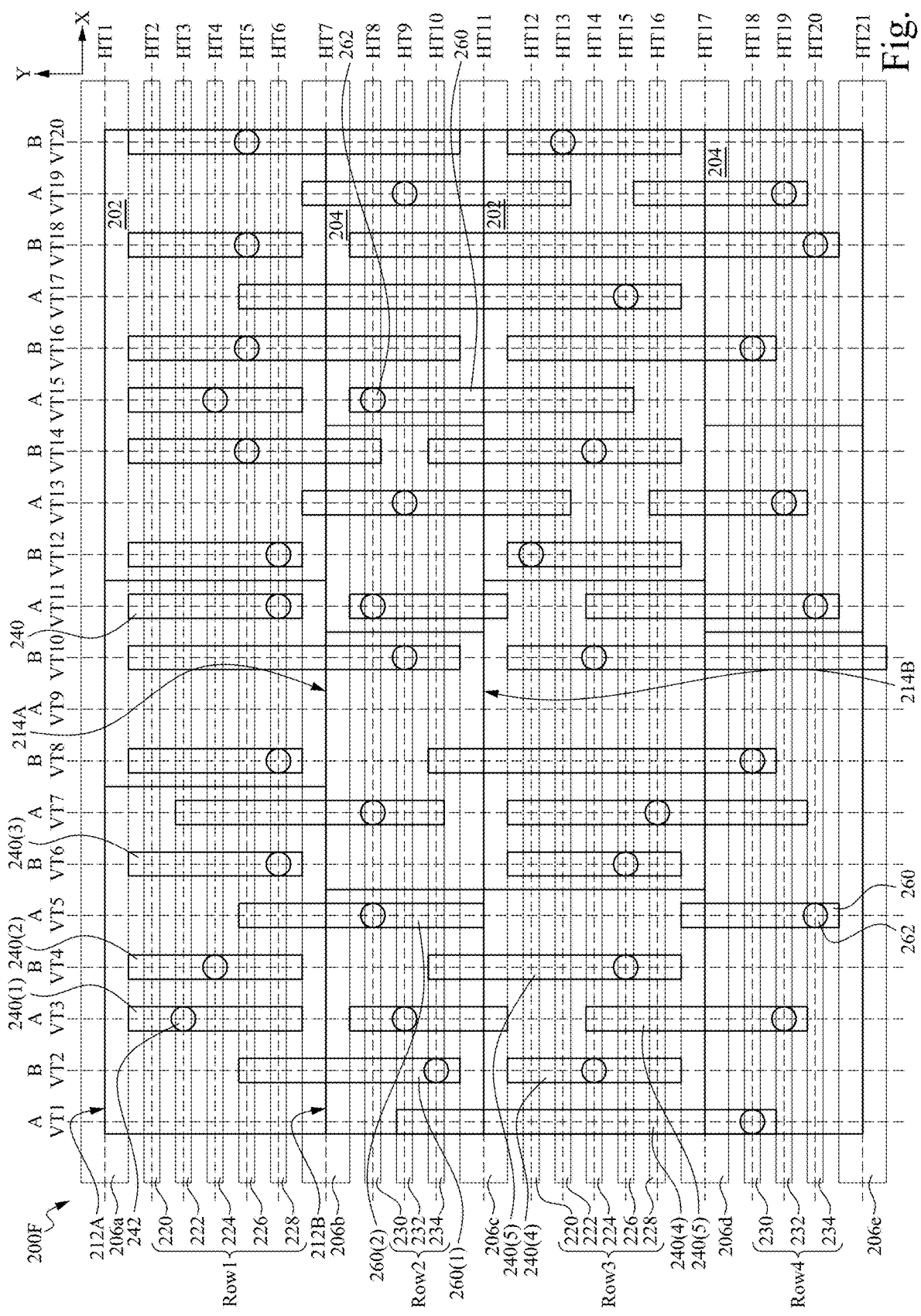

Referring to FIG. 1 and FIG. 2F, method 100 proceeds to operation 112 in which at least one second cell pin 260 and/or at least one first cell pin 240 are elongated. FIG. 2F is a layout diagram 200F of layout diagram 200F after elongating first and second cell pins 240 and 260, in accordance with some embodiments.

In operation 112, at least one second cell pin 260 among second cell pins 260 is elongated along the Y-direction so that all second cell pins 260 have a length equal to or greater than the minimum line length. The elongation of second cell pins 260 helps to improve pin accessibility, thereby helping to provide better routing efficiency and routing density for second cells 204. Likewise, in some embodiments, at least one first cell pin 240 among first cell pins 240 is elongated along the Y-direction crossing a corresponding boundary 212A or 212B of a first cell 202 where the at least one first cell pin 240 is located. The elongation of first cell pins 240 helps to improve pin accessibility, thereby helping to provide better routing efficiency and routing density for first cells 202. Each of first and second cell pins 240 and 260 can be elongated to any length as long as the minimum end-to-end spacing requirement is satisfied between facing ends of adjacent first cell pin 240 and second cell pin 260 on the same vertical routing track VT1-VT30 after pin elongation.

Figure 3:
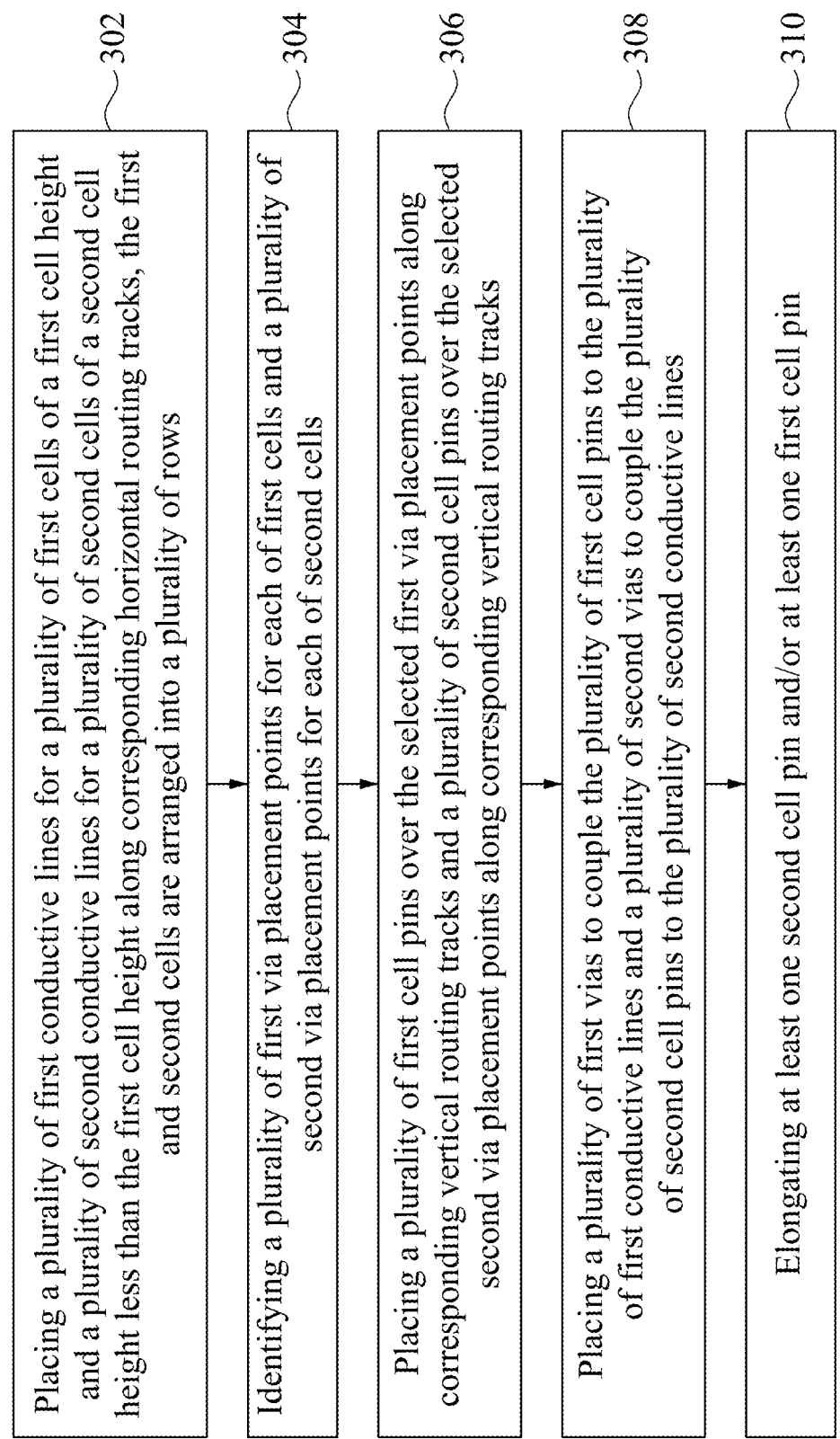
FIG. 3 is a flowchart of a method of generating a layout diagram of an IC, in accordance with some embodiments.

FIG. 3 is a flowchart of a method 300 of generating layout diagram 200F, in accordance with some embodiments. In various embodiments, the operations of method 300 are performed in the order depicted in FIG. 3 or in one or more orders other than the order depicted in FIG. 3. In some embodiments, one or more additional operations are performed before, between, during, and/or after one or more operations of method 300. Method 300 is describe below in conjunction with FIGS. 4A-4C where various stages of generating layout diagram 200F are illustrated. Unless specified otherwise, components in FIGS. 4A-4C that are essentially the same as their like components in FIGS. 2A-2F, are denoted by like reference numerals shown in FIGS. 2A-2F.

Similar to method 100, some or all of the operations of method 300 are capable of being performed as part of the APR tool. In some embodiments, some or all of method 300 is executed by a processor of a computer. In some embodiments, some or all of method 300 is executed by a processor 502 of an EDA system 500, discussed below with respect to FIG. 5. In some embodiments, some or all of the operations of method 300 are capable of being performed as part of a design procedure performed in a design house, e.g., a design house 620 discussed below with respect to FIG. 6.

Referring to FIG. 3, method 300 includes operation 302 in which a plurality of first conductive lines 220-228 for a plurality of first cells 202 of a first cell height and a plurality of second conductive lines for 232-236 for a plurality of second cell 204 of a second cell height CH1 less than the first cell height CH2 are placed along corresponding horizontal routing tracks HT1-HT21 of a routing grid; first and second cells 202 and 204 are arranged into a plurality of rows. Operation 302 is essentially the same as operation 102, and layout diagram 200A is generated after operation 302.

Referring to FIG. 3 and FIG. 4A, method 300 proceeds to operation 304 in which a plurality of first via placement points 270 are identified for each of first cells 202 and a plurality of second via placement points 250 are identified for each of second cells 204. FIG. 4A is a layout diagram 400A of layout diagram 200A after identifying a plurality of first via placement points 270 for each of first cells 202 and a plurality of second via placement points 250 for each of second cells 204, in accordance with some embodiments.

First via placement points 270 correspond to possible locations for placing first vias 242 (FIG. 4C) configured to electrically connect first conductive lines 220-228 in the M1 layer to first cell pins 240 (FIG. 4B) to be formed in the overlying M2 layer, thereby enabling signal transmission for first cells 202. First via placement points 270 are located at intersections of first conductive lines 220-2228 and corresponding vertical routing tracks in vertical routing tracks VT1-VT20.

Likewise, second via placement points 250 correspond to possible locations for placing second vias 262 (FIG. 4C) configured to electrically connect second conductive lines 232-236 in the M1 layer to second cell pins 260 (FIG. 4B) to be formed in the overlying M2 layer, thereby enabling signal transmission for second cells 204. Second via placement points 250 are located at intersections of second conductive lines 232-236 and corresponding vertical routing tracks in vertical routing tracks VT1-VT20.

Figure 4B:
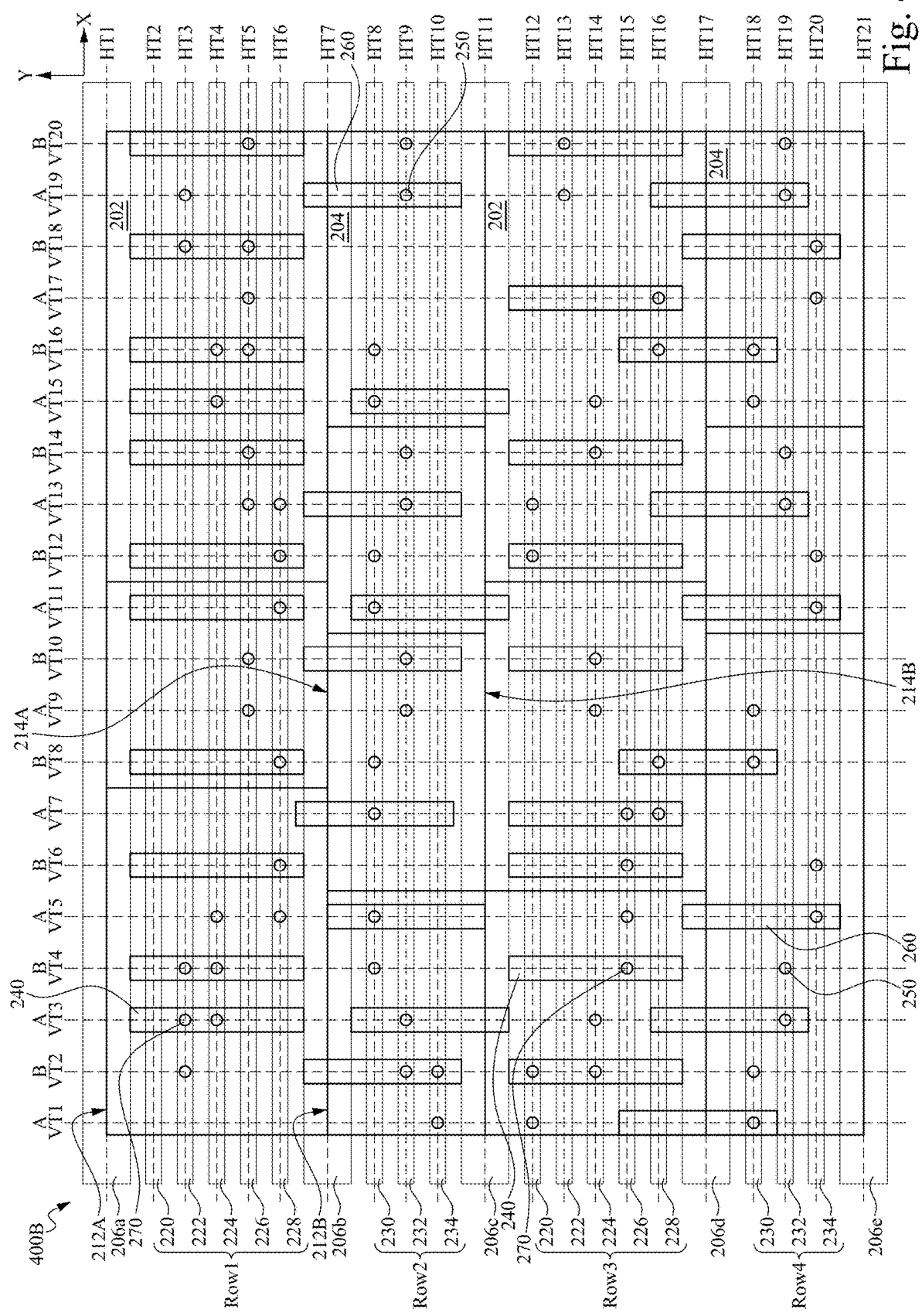

Referring to FIG. 3 and FIG. 4B, method 300 proceeds to operation 306 in which a plurality of first cell pins 240 is placed over the selected first via placement points 270 along corresponding vertical routing tracks VT1-VT20 and a plurality of second cell pins 260 is placed over the selected second via placement points 250 along corresponding vertical routing tracks VT1-VT20. FIG. 4B is a layout diagram 400B of layout diagram 400A after placing a plurality of first cell pins 240 over the selected first via placement points 270 along corresponding vertical routing tracks VT1-VT20 and a plurality of second cell pins 260 over the selected second via placement points 250 along corresponding vertical routing tracks VT1-VT20.

An algorithm is iteratively performed on all of via placement points 270 and 250 to evaluate free spaces available around first via placement points 270 and second via placement points 250. Based on the available free spaces, some first via placement points 270 and second via placement points 250 are selected such that placement of first cell pins 240 and second cell pins 270 on the corresponding selected via placement points 270 and 250 does not cause any violation of the minimum end-to-end spacing requirement as a first cell pin 240 and a second cell pin 260 for adjacent first and second cells 202 and 204 are placed on the same vertical routing track VT1-VT20.

Those first via placement points 270 suitable for placing first cell pins 240 and those second via placement points 250 suitable for placing second cell pins 260 are selected based on different design constraints applied to first cells pins 240 and second cell pins 260. For example, because first cells 202 have a relatively large cell height CH1 which allows first cells 202 to accommodate cell pins with a length equal to or greater than a minimum length, first cell pins 240 are able to be formed to conform to both of the minimum length requirement and the minimum boundary offset requirement. Accordingly, each first cell pin 240 is formed to have both ends terminated within top and bottom boundaries 212A and 212B of first cells 202. On the contrary, because second cells 204 have a relatively small cell height CH2 which only allows second cells 204 to accommodate cell pins with a length less than the minimum length, second cell pins 260 are not able to be formed to conform to the minimum length requirement and the minimum boundary offset requirement. Accordingly, each second cell pin 260 is either configured to have both ends terminated at top and bottom boundaries 214A and 214B of a second cell 204 when no first cell pins 240 are present on the same vertical routing tracking VT1-VT20 in adjacent rows, Row 1 and Row 3, or configured to have one end terminated within top and bottom boundaries 214A and 214B and another end extending across a corresponding top or boundary 214A or 214B of a second cell 204 into an adjacent row, Row 1 or Row 3, when only one first cell pin 240 is present on the same vertical routing track VT1-VT20 in Row 1 or Row 3. By applying different design constraints to first cell pins 240 and second cell pins 260, first cell pins 240 and second cell pins 260 can be placed such that facing ends of two adjacent first cell pins 240 and second cell pin 260 on the same vertical routing track VT1-VT20 satisfy the minimum end-to-end spacing requirement.

Subsequently, first cell pins 240 configured to input and output signals to first cells 202 are placed over the selected first via placement points 270 to extend along corresponding vertical routing tracks VT1-VT21 where the selected first via placement points 270 are located. And second cell pins 260 configured to input and output signals to second cells 204 are placed over the selected second via placement points 250 to extend along corresponding vertical routing tracks VT1-VT21 where the selected second via placement points 250 are located.

Figure 4C:
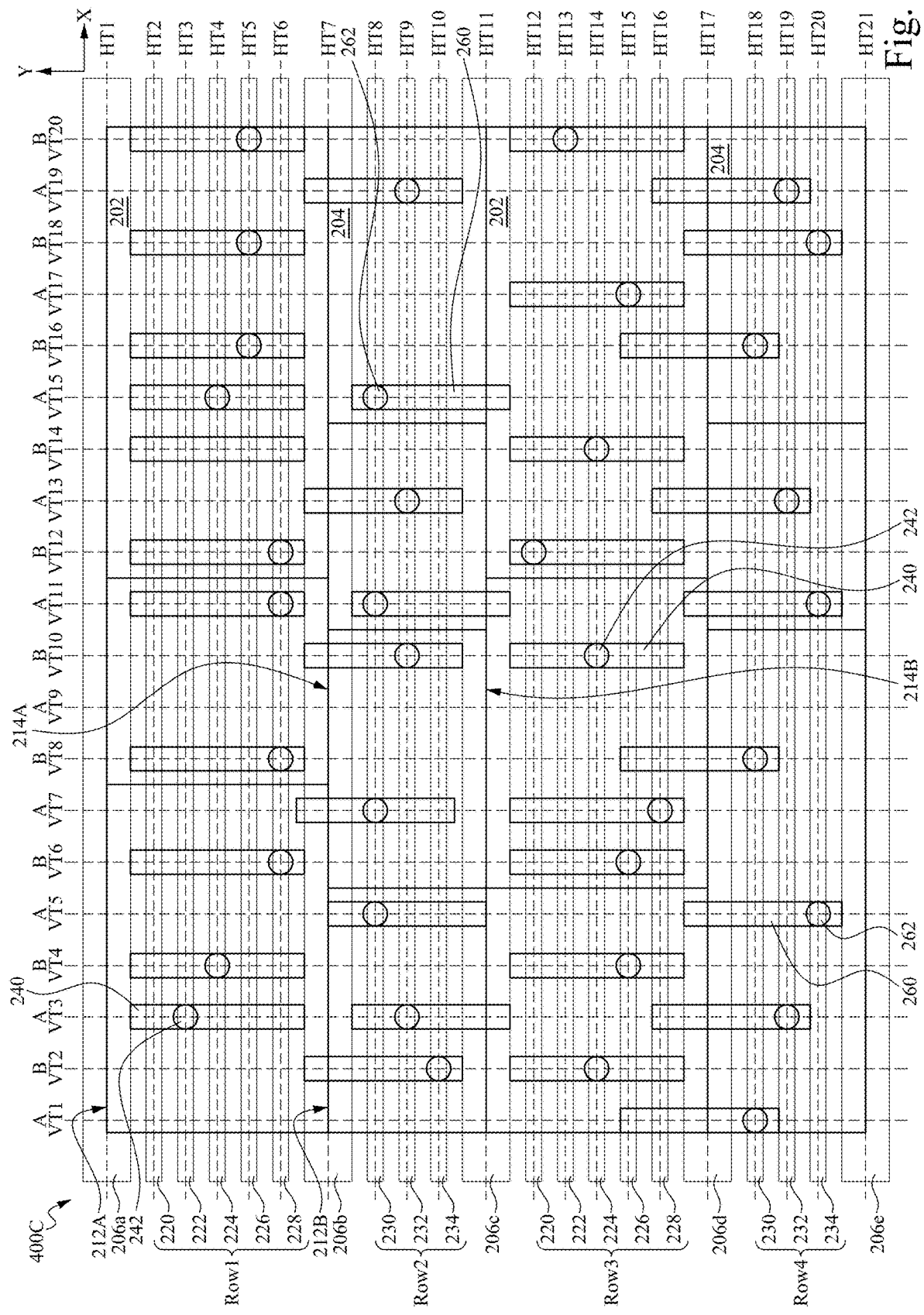

Referring to FIG. 3 and FIG. 4C, method 300 proceeds to operation 308 in which a plurality of first vias 242 is placed to couple the plurality of first cell pins 240 to the plurality of first conductive lines 220-228 and a plurality of second vias 262 is placed to couple the plurality of second cell pins 260 to the plurality of second conductive lines 232-236. FIG. 4C is a layout diagram 400C of layout diagram 400B after placing a plurality of first vias 242 to couple the plurality of first cell pins 240 to the plurality of first conductive lines and placing a plurality of second vias 262 to couple the plurality of second cell pins 260 to the plurality of second conductive lines 232-236, in accordance with some embodiments.

First cell pins 240 are electrically coupled to corresponding underlying first conductive lines 220-228 through first vias 242. First vias 242 are placed at locations of those via placement points 270 selected in operation 306. Likewise, second cell pins 260 are electrically coupled to corresponding underlying second conductive lines 232-236 through second vias 262. Second vias 262 are placed at locations of those via placement points 250 selected in operation 308.

Referring to FIG. 3 and FIG. 2F, method 300 proceeds to operation 310 in which at least one second cell pin 260 and/or at least one first cell pin 240 are elongated. Operation 310 is essentially the same as operation 112, and layout diagram 200F is generated after operation 310.

In the present disclosure, by using different design constraints in placing cell pins for cells of different cell heights, the routing for cells of different heights in a hybrid cell design is able to be performed under the same design block without pushing existing design rules. As a result, a 10% increase in pin placement utilization is achieved.

Figure 5:
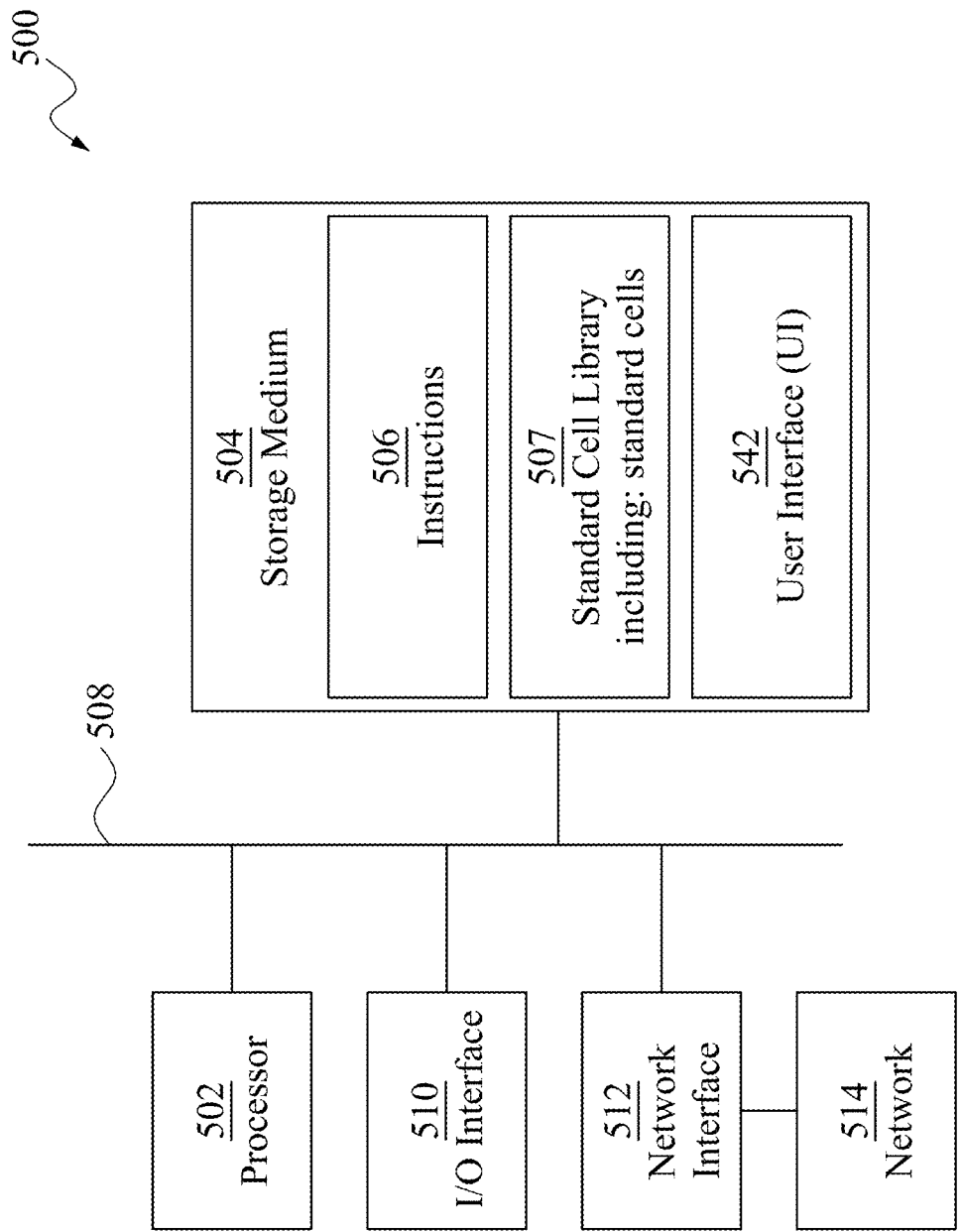
FIG. 5 is a block diagram of an electronic design automation (EDA) system, in accordance with some embodiments.

FIG. 5 is a block diagram of an electronic design automation (EDA) system 500 in accordance with some embodiments.

In some embodiments, EDA system 500 includes an APR tool. Methods described herein of designing layout diagrams represent wire routing arrangements, in accordance with one or more embodiments, are implementable, for example, using EDA system 500, in accordance with some embodiments.

In some embodiments, EDA system 500 is a general purpose computing device including a hardware processor 502 and a non-transitory, computer-readable storage medium 504. Storage medium 504, amongst other things, is encoded with, i.e., stores, computer program code 506, where computer program code 506 is a set of computer-executable instructions. Execution of computer program code 506 by processor 502 represents (at least in part) an APR tool which implements a portion or all of, e.g., the methods described herein in accordance with one or more (hereinafter, the noted processes and/or methods).

Processor 502 is electrically coupled to computer-readable storage medium 504 via a bus 508. Processor 502 is also electrically coupled to an I/O interface 510 by bus 508. A network interface 512 is also electrically connected to processor 502 via bus 508. Network interface 512 is connected to a network 514, so that processor 502 and computer-readable storage medium 504 are capable of connecting to external elements via network 514. Processor 502 is configured to execute computer program code 506 encoded in computer-readable storage medium 504 in order to cause EDA system 500 to be usable for performing a portion or all of the noted processes and/or methods. In one or more embodiments, processor 502 is a central processing unit (CPU), a multi-processor, a distributed processing system, an application specific integrated circuit (ASIC), and/or a suitable processing unit.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 504 includes a compact disk-read only memory (CD-ROM), a compact disk-read/write (CD-R/W), and/or a digital video disc (DVD).

In one or more embodiments, storage medium 504 stores computer program code 506 configured to cause EDA system 500 (where such execution represents (at least in part) the APR tool) to be usable for performing a portion or all of the noted processes and/or methods. In one or more embodiments, storage medium 504 also stores information which facilitates performing a portion or all of the noted processes and/or methods. In one or more embodiments, storage medium 504 stores library 507 of standard cells including such standard cells corresponding to cells disclosed herein.

EDA system 500 includes I/O interface 510. I/O interface 510 is coupled to external circuitry. In one or more embodiments, I/O interface 510 includes a keyboard, keypad, mouse, trackball, trackpad, touchscreen, and/or cursor direction keys for communicating information and commands to processor 502.

EDA system 500 also includes network interface 512 coupled to processor 502. Network interface 512 allows EDA system 500 to communicate with network 514, to which one or more other computer systems are connected. Network interface 512 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 500.

EDA system 500 is configured to receive information through I/O interface 510. The information received through I/O interface 510 includes one or more of instructions, data, design rules, libraries of standard cells, and/or other parameters for processing by processor 502. The information is transferred to processor 502 via bus 508. EDA system 500 is configured to receive information related to a UI through I/O interface 510. The information is stored in computer-readable medium 504 as user interface (UI) 542.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an APR tool. In some embodiments, a portion or all of the noted processes and/or methods is implemented as a software application that is used by EDA system 500. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 6:
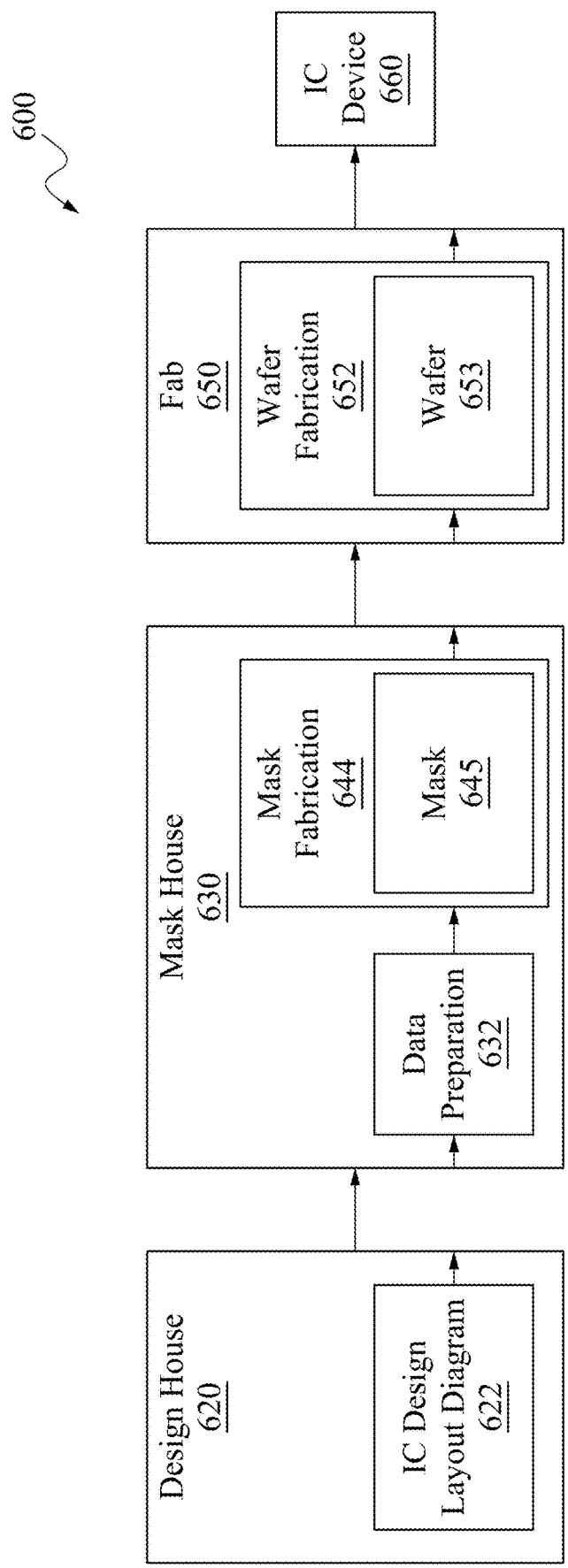
FIG. 6 is a block diagram of an IC manufacturing system and an IC manufacturing flow associated therewith, in accordance with some embodiments.

FIG. 6 is a block diagram of an IC manufacturing system 600, and an IC manufacturing flow associated therewith, in accordance with some embodiments.

In some embodiments, based on a layout diagram, at least one of (A) one or more semiconductor masks or (B) at least one component in a layer of a semiconductor integrated circuit is fabricated using IC manufacturing system 600.

In FIG. 6, IC manufacturing system 600 includes entities, such as a design house 620, a mask house 630, and an IC manufacturer/fabricator ("fab") 650, that interact with one another in the design, development, and manufacturing cycles and/or services related to manufacturing an IC device 660. The entities in system 600 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 620, mask house 630, and IC fab 650 is owned by a single larger company. In some embodiments, two or more of design house 820, mask house 630, and IC fab 650 coexist in a common facility and use common resources.

Design house (or design team) 620 generates an IC design layout diagram 622. IC design layout diagram 622 includes various geometrical patterns designed for an IC device 660. The geometrical patterns correspond to patterns of metal, oxide, or semiconductor layers that make up the various components of IC device 660 to be fabricated. The various layers combine to form various IC features. For example, a portion of IC design layout diagram 622 includes various IC features, such as an active region, gate electrode, source and drain, conductive lines or vias of an interlayer interconnection, and openings for bonding pads, to be formed in a semiconductor substrate (such as a silicon wafer) and various material layers disposed on the semiconductor substrate. Design house 620 implements a proper design procedure to form IC design layout diagram 622. The design procedure includes one or more of logic design, physical design or place and route. IC design layout diagram 622 is presented in one or more data files having information of the geometrical patterns. For example, IC design layout diagram 622 can be expressed in a GDSII file format or DFII file format.

Mask house 630 includes data preparation 632 and mask fabrication 644. Mask house 630 uses IC design layout diagram 622 to manufacture one or more masks 645 to be used for fabricating the various layers of IC device 660 according to IC design layout diagram 622. Mask house 630 performs mask data preparation 632, where IC design layout diagram 622 is translated into a representative data file ("RDF"). Mask data preparation 632 provides the RDF to mask fabrication 644. Mask fabrication 644 includes a mask writer. A mask writer converts the RDF to an image on a substrate, such as a mask (reticle) 645 or a semiconductor wafer 653. The design layout diagram 622 is manipulated by mask data preparation 632 to comply with particular characteristics of the mask writer and/or requirements of IC fab 650. In FIG. 6, mask data preparation 632 and mask fabrication 644 are illustrated as separate elements. In some embodiments, mask data preparation 632 and mask fabrication 644 can be collectively referred to as mask data preparation.

In some embodiments, mask data preparation 632 includes optical proximity correction (OPC) which uses lithography enhancement techniques to compensate for image errors, such as those that can arise from diffraction, interference, other process effects and the like. OPC adjusts IC design layout diagram 862. In some embodiments, mask data preparation 632 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 632 includes a mask rule checker (MRC) that checks the IC design layout diagram 622 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 622 to compensate for limitations during mask fabrication 644, which may undo part of the modifications performed by OPC in order to meet mask creation rules.

In some embodiments, mask data preparation 632 includes lithography process checking (LPC) that simulates processing that will be implemented by IC fab 650 to fabricate IC device 660. LPC simulates this processing based on IC design layout diagram 622 to create a simulated manufactured device, such as IC device 660. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 622.

It should be understood that the above description of mask data preparation 632 has been simplified for the purposes of clarity. In some embodiments, data preparation 632 includes additional features such as a logic operation (LOP) to modify the IC design layout diagram 622 according to manufacturing rules. Additionally, the processes applied to IC design layout diagram 622 during data preparation 632 may be executed in a variety of different orders.

After mask data preparation 632 and during mask fabrication 644, a mask 645 or a group of masks 645 are fabricated based on the modified IC design layout diagram 622. In some embodiments, mask fabrication 644 includes performing one or more lithographic exposures based on IC design layout diagram 822. In some embodiments, an electron-beam (e-beam) or a mechanism of multiple e-beams is used to form a pattern on a mask (photomask or reticle) 645 based on the modified IC design layout diagram 622. Mask 645 can be formed in various technologies. In some embodiments, mask 645 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 645 includes a transparent substrate (e.g., fused quartz) and an opaque material (e.g., chromium) coated in the opaque regions of the binary mask. In another example, mask 645 is formed using a phase shift technology. In a phase shift mask (PSM) version of mask 645, various features in the pattern formed on the phase shift mask are configured to have proper phase difference to enhance the resolution and imaging quality. In various examples, the phase shift mask can be attenuated PSM or alternating PSM. The mask(s) generated by mask fabrication 644 is used in a variety of processes. For example, such a mask(s) is used in an ion implantation process to form various doped regions in semiconductor wafer 653, in an etching process to form various etching regions in semiconductor wafer 653, and/or in other suitable processes.

IC fab 650 includes wafer fabrication 652. IC fab 650 is an IC fabrication business that includes one or more manufacturing facilities for the fabrication of a variety of different IC products. In some embodiments, IC Fab 650 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 650 uses mask(s) 645 fabricated by mask house 630 to fabricate IC device 660. Thus, IC fab 650 at least indirectly uses IC design layout diagram 622 to fabricate IC device 660. In some embodiments, semiconductor wafer 653 is fabricated by IC fab 650 using mask(s) 645 to form IC device 660. In some embodiments, the IC fabrication includes performing one or more lithographic exposures based at least indirectly on IC design layout diagram 622. Semiconductor wafer 653 includes a silicon substrate or other proper substrate having material layers formed thereon. Semiconductor wafer 653 further includes one or more of various doped regions, dielectric features, multi-level interconnects, and the like (formed at subsequent manufacturing steps).

Details regarding an integrated circuit (IC) manufacturing system (e.g., system 600 of FIG. 6), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

An aspect of this description relates to a method. The method includes arranging a first cell having a first cell height in a first row. The method further includes arranging a second cell having a second cell height in a second row abutting the first row, wherein the second cell height is different from the first cell height. The method further includes placing a plurality of first cell pins within the first cell, wherein each of the plurality of first cell pins extends along a corresponding routing track. The method further includes placing a plurality of second cell pins over a plurality of selected via placement points in the second cell, wherein at least one second cell pin of the plurality of second cell pins extends along a second routing track across a boundary of the second cell and into the first cell. In some embodiments, placing the plurality of second cell pins over the plurality of selected via placement points includes determining whether a second cell pin of the plurality of second cell pins violates an end-to-end spacing requirement. In some embodiments, the method further includes setting the location of the second cell pin in response to a determination that the end-to-end spacing requirement is satisfied. In some embodiments, further includes removing the second cell pin in response to a determination that the end-to-end spacing requirement is not satisfied. In some embodiments, the method further elongating at least one of the plurality of second cell pins following the placing of the plurality of second cell pins. In some embodiments, elongating the at least one of the plurality of second cell pins includes extending the at least one of the plurality of second cell pins across the boundary. In some embodiments, the method further includes elongating at least one of the plurality of first cell pins following the placing of the plurality of first cell pins. In some embodiments, elongating the at least one of the plurality of first cell pins includes extending the at least one of the plurality of first cell pins across the boundary. In some embodiments, the method further includes manufacturing at least one mask for forming the first cell or the second cell.

An aspect of this description relates to a method including arranging a first cell abutting a second cell, wherein the first cell has a first height, the second cell has a second height, and the second height is less than the first height. The method further includes arranging a third cell abutting the second cell, wherein the second cell is between the first cell and the third cell, and the third cell has the first height. The method further includes placing a first cell pin on a first routing track in the first cell, wherein the first routing track extends from the first cell to the third cell. The method further includes placing a second cell pin on a second routing track in the second cell, wherein the second routing track extends from the first cell to the third cell. The method further includes placing a third cell pin on a third routing track in the third cell, wherein the third routing track extends from the first cell to the third cell. The method further includes determining whether the second cell pin satisfies an end-to-end spacing requirement with respect to each of the first cell pin and the third cell pin. The method further includes setting a location of the second cell pin in response to a determination that the second cell pin satisfies the end-to-end spacing requirement. The method further includes removing the second cell pin in response to a determination that the second cell pin fails the end-to-end spacing requirement. In some embodiments, the first routing track is a same routing track as the second routing track. In some embodiments, the second routing track is a same routing track as the third routing track. In some embodiments, placing the second cell pin includes determining a plurality of via placement locations in the second cell; and placing the second cell pin to overlap with at least one of the via placement locations. In some embodiments, placing the second cell pin includes placing the second cell pin after placing the first cell pin and after placing the third cell pin. In some embodiments, placing the first cell pin includes determining a plurality of via placement locations in the first cell; and placing the first cell pin to overlap with at least one of the via placement locations. In some embodiments, the method further includes manufacturing at least one mask for forming the first cell, the second cell or the third cell.

An aspect of this description relates to a system. The system includes a non-transitory computer readable medium for storing instructions thereon. The system further includes a processor connected to the non-transitory computer readable medium. The processor is configured to execute the instructions for retrieving a first cell from a library stored in the non-transitory computer readable medium, wherein the first cell has a first height. The processor is further configured to execute the instructions for retrieving a second cell from the library, wherein the second cell has a second height different from the first height. The processor is further configured to execute the instructions for arranging the first cell in a first row extending in a first direction. The processor is further configured to execute the instructions for arranging the second cell in a second row abutting the first row, wherein the second row extends in the first direction. The processor is further configured to execute the instructions for placing a plurality of first cell pins within the first cell, wherein each of the plurality of first cell pins extends in a second direction perpendicular to the first direction. The processor is further configured to execute the instructions for placing a plurality of second cell pins over a plurality of selected via placement points in the second cell, wherein the plurality of second cells extends in the second direction, and at least one second cell pin of the plurality of second cell pins extends across a boundary of the second cell and into the first cell. In some embodiments, the processor is further configured to execute the instructions for elongating at least one of the plurality of second cell pins, wherein the elongated at least one of the plurality of second cell pins extends across the boundary. In some embodiments, the processor is further configured to execute the instructions for elongating at least one of the plurality of first cell pins, wherein the elongated at least one of the plurality of first cell pins extends across the boundary. In some embodiments, the processor is further configured to execute the instructions for instructing at least one manufacturing tool for manufacturing at least one mask for forming the first cell or the second cell.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
arranging a first cell having a first cell height in a first row;
arranging a second cell having a second cell height in a second row abutting the first row, wherein the second cell height is different from the first cell height;
placing a plurality of first cell pins within the first cell, wherein each of the plurality of first cell pins extends along a corresponding routing track; and
placing a plurality of second cell pins over a plurality of selected via placement points in the second cell, wherein at least one second cell pin of the plurality of second cell pins extends along a second routing track across a boundary of the second cell and into the first cell.

2. The method of claim 1, wherein placing the plurality of second cell pins over the plurality of selected via placement points comprises determining whether a second cell pin of the plurality of second cell pins violates an end-to-end spacing requirement.

3. The method of claim 2, further comprising setting the location of the second cell pin in response to a determination that the end-to-end spacing requirement is satisfied.

4. The method of claim 2, further comprising moving the second cell pin in response to a determination that the end-to-end spacing requirement is not satisfied.

5. The method of claim 1, further comprising elongating at least one of the plurality of second cell pins following the placing of the plurality of second cell pins.

6. The method of claim 5, wherein elongating the at least one of the plurality of second cell pins comprises extending the at least one of the plurality of second cell pins across the boundary.

7. The method of claim 1, further comprising elongating at least one of the plurality of first cell pins following the placing of the plurality of first cell pins.

8. The method of claim 7, wherein elongating the at least one of the plurality of first cell pins comprises extending the at least one of the plurality of first cell pins across the boundary.

9. The method of claim 1, further comprising manufacturing at least one mask for forming the first cell or the second cell.

10. A method comprising:
arranging a first cell abutting a second cell, wherein the first cell has a first height, the second cell has a second height, and the second height is less than the first height;
arranging a third cell abutting the second cell, wherein the second cell is between the first cell and the third cell, and the third cell has the first height;
placing a first cell pin on a first routing track in the first cell, wherein the first routing track extends from the first cell to the third cell;
placing a second cell pin on a second routing track in the second cell, wherein the second routing track extends from the first cell to the third cell;
placing a third cell pin on a third routing track in the third cell, wherein the third routing track extends from the first cell to the third cell;
determining whether the second cell pin satisfies an end-to-end spacing requirement with respect to each of the first cell pin and the third cell pin;
setting a location of the second cell pin in response to a determination that the second cell pin satisfies the end-to-end spacing requirement; and
moving the second cell pin in response to a determination that the second cell pin fails the end-to-end spacing requirement.

11. The method of claim 10, wherein the first routing track is a same routing track as the second routing track.

12. The method of claim 10, wherein the second routing track is a same routing track as the third routing track.

13. The method of claim 10, wherein placing the second cell pin comprises:
determining a plurality of via placement locations in the second cell; and
placing the second cell pin to overlap with at least one of the plurality of via placement locations.

14. The method of claim 10, wherein placing the second cell pin comprises placing the second cell pin after placing the first cell pin and after placing the third cell pin.

15. The method of claim 10, wherein placing the first cell pin comprises:
determining a plurality of via placement locations in the first cell; and
placing the first cell pin to overlap with at least one of the plurality of via placement locations.

16. The method of claim 10, further comprising manufacturing at least one mask for forming the first cell, the second cell or the third cell.

17. A system comprising:
a non-transitory computer readable medium for storing instructions thereon; and
a processor connected to the non-transitory computer readable medium, wherein the processor is configured to execute the instructions for:
retrieving a first cell from a library stored in the non-transitory computer readable medium, wherein the first cell has a first height;
retrieving a second cell from the library, wherein the second cell has a second height different from the first height;
arranging the first cell in a first row extending in a first direction;
arranging the second cell in a second row abutting the first row, wherein the second row extends in the first direction;
placing a plurality of first cell pins within the first cell, wherein each of the plurality of first cell pins extends in a second direction perpendicular to the first direction; and
placing a plurality of second cell pins over a plurality of selected via placement points in the second cell, wherein the plurality of second cells extends in the second direction, and at least one second cell pin of the plurality of second cell pins extends across a boundary of the second cell and into the first cell.

18. The system of claim 17, wherein the processor is further configured to execute the instructions for:
elongating at least one of the plurality of second cell pins, wherein the elongated at least one of the plurality of second cell pins extends across the boundary.

19. The system of claim 17, wherein the processor is further configured to execute the instructions for:
elongating at least one of the plurality of first cell pins, wherein the elongated at least one of the plurality of first cell pins extends across the boundary.

20. The system of claim 17, wherein the processor is further configured to execute the instructions for:
instructing at least one manufacturing tool for manufacturing at least one mask for forming the first cell or the second cell.

* * * * *